Dec. 4, 1923.
F. T. FRIDRICH
AUXILIARY ACCELERATOR
Filed Sept. 9, 1922
1,476,398
2 Sheets-Sheet 1
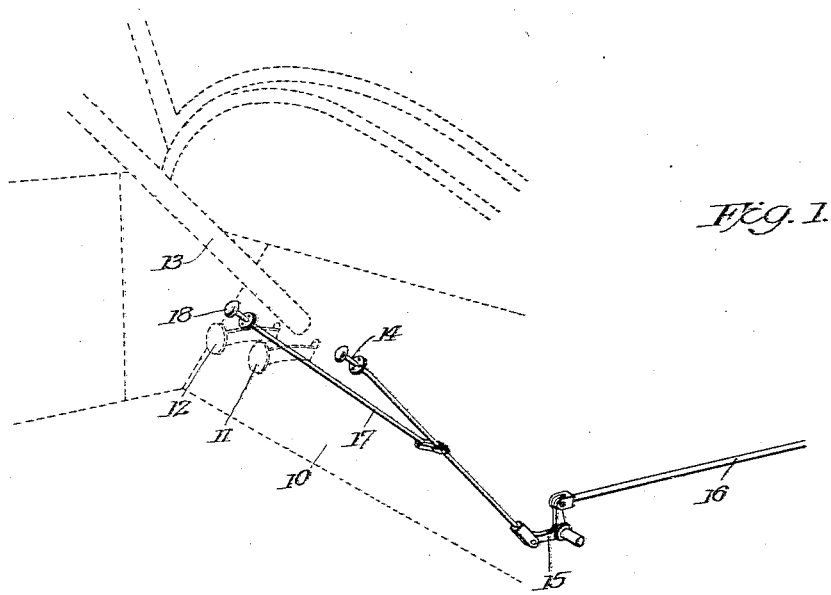
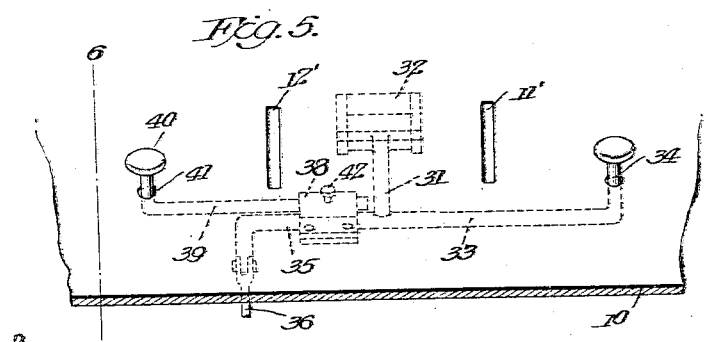
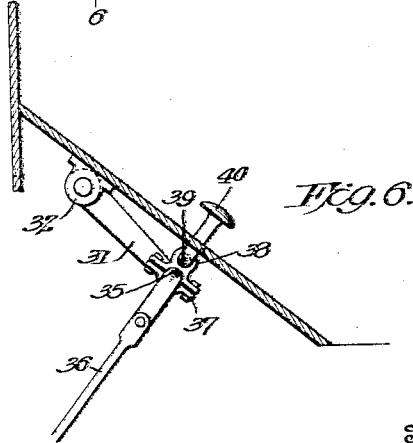
Inventor
F. T. FRIDRICH Dec. 4, 1923.
F. T. FRIDRICH
1,476,398
AUXILIARY ACCELERATOR
Filed Sept. 9, 1922    2 Sheets-Sheet 2
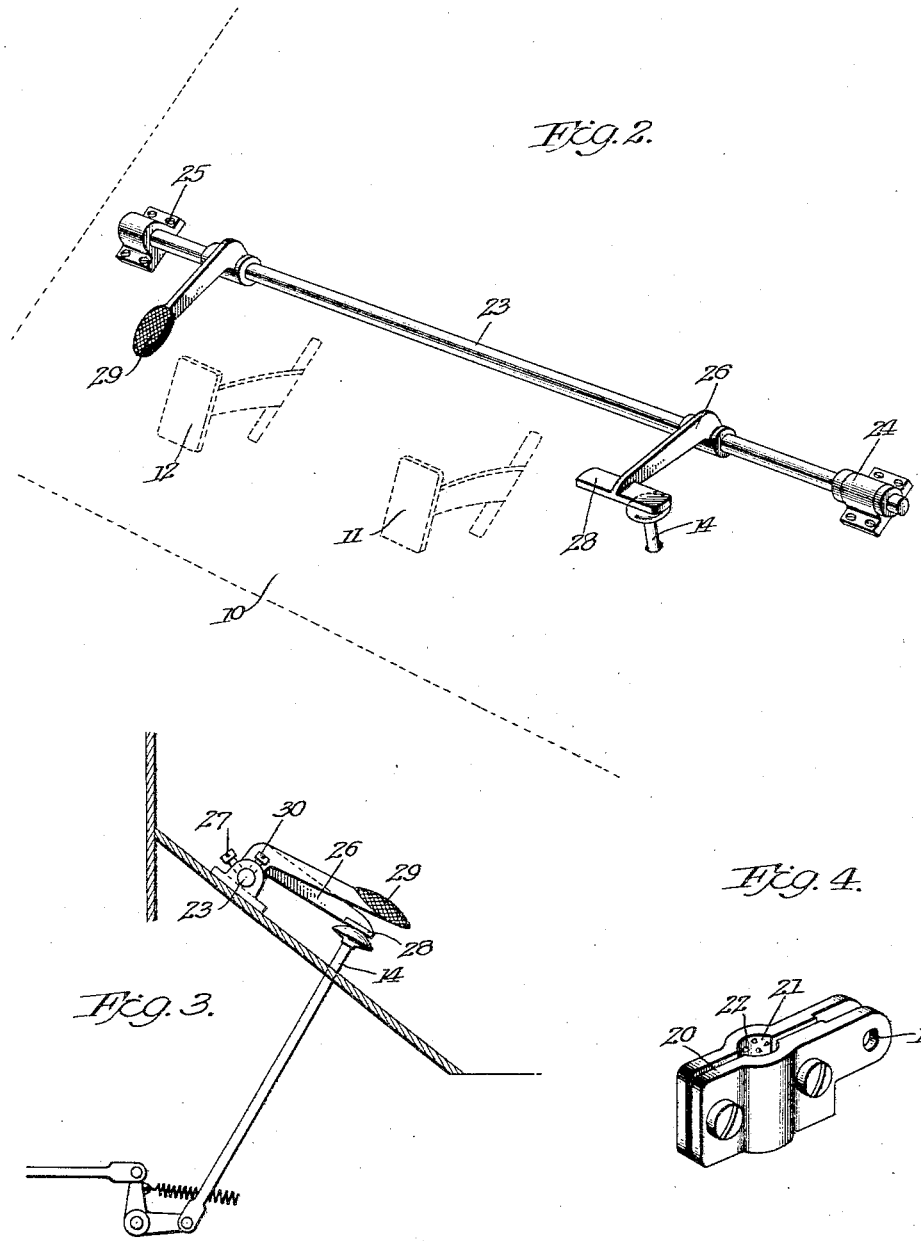
Inventor
F. T. FRIDRICH
By Cushman, Bryant & Darby
Attorneys Patented Dec. 4, 1923.

1,476,398

UNITED STATES PATENT OFFICE.

FRANK T. FRIDRICH, OF NORTH BEND, NEBRASKA.

AUXILIARY ACCELERATOR.

Application filed September 9, 1922. Serial No. 587,087.

*To all whom it may concern:*

Be it known that I, FRANK T. FRIDRICH, a citizen of the United States, residing at North Bend, in the county of Dodge and State of Nebraska, have invented new and useful Improvements in Auxiliary Accelerators, of which the following is a specification.

This invention relates to control devices for motor vehicles, and more particularly to an attachment adapted to permit the driver of the vehicle to control the speed of the motor by using either foot.

In the use of motor vehicles, particularly on long trips, the foot which operates the accelerator becomes cramped, and it is customary for the driver to use the hand throttle, although, were it not for the so called "driver's cramp," the operator would prefer to control the speed of the motor by means of the foot. This is much more convenient for the reason that it leaves both hands free to control the spark lever and steering mechanism, and additionally, because the foot accelerator automatically throttles down the motor when pressure thereupon is relieved.

It is an object of the present invention to provide an additional foot operable means for controlling the gas supply, such means being located upon the same side of the center of the car as the usual accelerator but laterally spaced from such accelerator whereby the driver may use either foot for controlling the speed of the motor.

A further object of the invention is to provide means of the character above mentioned which may readily be attached to practically any vehicle, and which, preferably, may be thrown out of operation whenever desirable.

The above and other objects of the invention may be accomplished by devices which vary considerably in their specific form, although, preferably, the invention takes the form of a readily attachable mechanism which may be operated by the left foot, when, as is customary, the accelerator upon the vehicle is operated by the right foot, to depress the pedal portion of the accelerator mechanism provided with the car.

In the accompanying drawings there are shown several suitable illustrative embodiments of the invention, and in the drawings:—

Fig. 1 is a perspective,

Fig. 2 is a perspective of a modified structure,

Fig. 3 is a cross section of the mechanism shown in Fig. 2,

Fig. 4 is a detail view of the form shown in Fig. 1,

Fig. 5 is a top plan of a still further modification, and

Fig. 6 is a cross section on the line 6—6 of Fig. 5 looking in the direction of the arrows.

Referring to the drawings for a more detailed description, and considering particularly Figs. 1 and 4, 10 indicates, conventionally, the foot board of a motor vehicle having the usual brake and clutch pedals 11 and 12 projecting therethrough adjacent the steering mechanism, indicated at 13. Immediately adjacent the brake pedal 11, as is customary, is shown the accelerator pedal 14 which consists of a rod extending through the foot board to a bell crank lever 15 which, in turn, is connected by means of a link 16 to the carbureter valve (not shown). That portion of the disclosure above described is old and well known in the art and is shown in the drawings to illustrate the relation of the invention to the usual mechanism of a motor vehicle.

The accelerator pedal 14 being positioned to the right of the brake pedal and in front of the driver's seat is operable by the right foot of the driver. The additional means for controlling the gas supply should be placed in convenient position for the driver's left foot, and such a position, for instance, may be on the opposite side of the clutch pedal 12 from the customary single foot accelerator 14. Of course, the exact position of the additional controlling means may be varied somewhat, it being simply necessary that it be on the same side of the center of the car as the usual accelerator, which is ordinarily placed in position so as to be operated by the right foot.

In the form of the invention shown in Figs. 1 and 4 this additional means comprises a rod 17 extending through the foot board and having a pedal portion 18. Beneath the foot board the rod is connected to the accelerator mechanism of the vehicle; and in the present instance this is effected by securing the same in an opening 19 (Fig. 4) of a two-part clamp 20 which engages the accelerator rod 14 in any selected position which will vary in different makes of machines. The clamp 20 has a substantially circular gripping portion 21 which may be provided with suitable gripping teeth 22 to engage the rod 14 to prevent accidental movement of the clamp and the left foot accelerator pedal. In order to apply this mechanism to the vehicle it is simply necessary to provide an additional opening in the foot board and to connect the rod 17 and the accelerator rod 14 by means of the clamp 20, the part of the rod to be engaged by the clamp being dependent upon the relative size and position of the parts, which will vary in different types of vehicles.

Referring to Figs. 2 and 3 there is shown in these views the foot board 10 together with the brake pedal 11, the clutch pedal 12 and accelerator pedal 14 in position to be engaged, in the present instance, by the right foot of the driver. A rock shaft 23 extends transversely of the car, in the present instance above the brake and clutch pedals, and has bearings in brackets 24 which are secured to the foot board as by means of screws 25. An arm 26 is fixedly mounted upon the shaft but may be adjusted longitudinally thereof if desired, since it is held in position by means of a set screw 27; and carries a cross-head 28 above the accelerator pedal 14. By having the arm adjustable longitudinally of the rod it is not necessary to locate the bearing brackets 24 with accuracy since the arm itself may be adjusted along the rod so that the arm is placed in suitable position above the accelerator pedal. The rock shaft is operated by means located in convenient proximity to the left foot of the driver; such means may take the form of a pedal 29 fixedly secured upon the rock shaft, as by means of a set screw 30 which permits the lever to be adjusted longitudinally of the shaft to accommodate the device to different types of vehicles.

When the operator is using the accelerator pedal 14 the same may be actuated by pressing the foot upon the cross head 28, or rather, that portion of the cross head which is not positioned above the pedal. Or, if he prefers, the rock shaft together with the arm 26 and lever 29 may be rotated to throw the arm and pedal upwardly to remove the cross bar from above the pedal 14.

Still another embodiment of the invention is shown in Figs. 5 and 6, wherein 10 indicates the foot board and 11', 12', respectively, the slots therein for the brake and clutch levers. In this figure the accelerator mechanism, which is shown as positioned beneath the foot board, comprises a lever 31 fulcrumed in a bearing bracket 32 secured to the under surface of the floor board. The lever has a laterally extending arm 33 provided with a terminal portion 34 projecting upwardly through the foot board to constitute a pedal. A portion 35 extends in the opposite direction and is connected, by means of a link 36 pivotally secured thereto, to the carbureter valve. This type of accelerator mechanism is used upon a great many makes of vehicles and in applying the invention to such vehicles it may take the form now to be described. A clamp or other suitable securing means 37 is fastened to the extension 35 of the accelerator lever 31 and has an eye 38 into which is inserted the end of a rod 39 having a pedal portion 40 projecting through an opening 41 in the foot board on the opposite side of the clutch slot 12' from the accelerator pedal 34. The rod 39 may be held in position in the clamp eye by means of a set screw 42 which allows adjustment of the rod toward and from the accelerator pedal 34 in order to permit the additional pedal to be placed in position convenient for the operator. No claims specific to the form of the invention illustrated in Figures 5 and 6 are presented in this application, since the form is covered specifically by the copending application Serial No. 656,915, filed August 11, 1923.

It will be understood that the invention might be embodied in mechanisms differing considerably from the devices illustrated in the drawings and herein described in detail. It will be observed, however, that there are two distinguishing features of the invention, namely, the manner in which it lends itself to ready application to a vehicle, and the simplicity of its construction. These, however, are not the essential features of the invention, which consists broadly, in means positioned adjacent the driver's seat convenient for use by the other foot of the driver from that which operates the usual foot accelerator.

I claim:

1. In an automobile having brake and clutch pedals, the combination with the usual accelerator having a foot operated pedal positioned substantially in front of the driver's seat, of additional means for controlling the gas supply positioned on the floor of the car on the same side of the longitudinal center of the car with the driver's seat and spaced laterally from said accelerator pedal whereby either foot of a driver may be used to control the gas supply, said means being operable independently of the clutch and brake pedals.

2. In an automobile having brake and clutch pedals, the combination with the usual accelerator having a foot operated pedal positioned substantially in front of the driver's seat, of additional means for operating said accelerator positioned on the floor of the car on the same side of the longitudinal center of the car with the driver's seat and spaced laterally from said accelerator pedal whereby either foot of a driver may be used to control the gas supply, said means being operable independently of the clutch and brake pedals.

3. In a motor vehicle having brake and clutch pedals, the combination with an accelerator pedal positioned adjacent the driver's seat, of an attachment comprising a rock shaft extending transversely of the car, an arm on the shaft operatively associated with the accelerator pedal, a pedal on the shaft spaced laterally from said accelerator pedal on the same side of the longitudinal center of the car with the said accelerator pedal and independent of the brake or clutch pedals, whereby either foot of the driver may be used to control the gas supply and without actuating the brake or clutch pedals.

4. In a motor vehicle having brake and clutch pedals, the combination with the usual accelerator pedal positioned adjacent the driver's seat, of means for selectively controlling the gas supply by either foot of the driver, comprising a rock shaft extending transversely of the car, an arm on the shaft extending over and contacting with the accelerator pedal, a pedal on the shaft spaced laterally from said pedals on the same side of the longitudinal center of the car as the said accelerator pedal and independent of the brake and clutch pedals.

5. In a motor vehicle having brake and clutch pedals, the combination with the usual accelerator pedal positioned adjacent the driver's seat, of means for selectively controlling the gas supply by either foot of the driver, comprising a rock shaft extending transversely of the car, an arm on the shaft operatively associated with the accelerator pedal, a pedal on the shaft spaced laterally from said accelerator pedal on the same side of the longitudinal center of the car as the accelerator pedal and independent of the brake and clutch pedals, said pedal and arm being relatively adjustable longitudinally of the shaft.

In testimony whereof I have hereunto set my hand.

FRANK T. FRIDRICH.